United States Patent

Deguchi et al.

[11] Patent Number: 5,662,084
[45] Date of Patent: Sep. 2, 1997

[54] ENGINE IDLING SPEED CONTROL APPARATUS

[75] Inventors: Yoshitaka Deguchi, Yokosuka; Nobutaka Takahashi, Yokohama, both of Japan

[73] Assignee: Nissan Motor Co., Ltd., Kanagawa, Japan

[21] Appl. No.: 683,145

[22] Filed: Jul. 18, 1996

[30] Foreign Application Priority Data

Jul. 18, 1995 [JP] Japan .................................... 7-181851

[51] Int. Cl.⁶ .................................................. F02B 75/00
[52] U.S. Cl. ................................. 123/339.11; 123/339.2
[58] Field of Search ........................ 123/39.11, 339.2, 123/339.16, 339.19, 585

[56] References Cited

U.S. PATENT DOCUMENTS

| | | | |
|---|---|---|---|
| 4,508,075 | 4/1985 | Takao et al. | 123/339.11 |
| 5,133,319 | 7/1992 | Ikeda et al. | 123/339.11 |
| 5,253,623 | 10/1993 | Melnyk et al. | 123/339.11 |
| 5,269,271 | 12/1993 | Kawai et al. | 123/339.11 |
| 5,320,077 | 6/1994 | Kamiya et al. | 123/339.11 |
| 5,445,124 | 8/1995 | Tomisawa et al. | 123/339.11 |
| 5,463,993 | 11/1995 | Livshits et al. | 123/339.2 |
| 5,479,897 | 1/1996 | Kawai et al. | 123/339.2 |

FOREIGN PATENT DOCUMENTS 61-169642  7/1986  Japan ............................... 123/339.11

*Primary Examiner*—Raymond A. Nelli
*Attorney, Agent, or Firm*—Lowe, Price, LeBlanc & Becker

[57] ABSTRACT

An engine idling speed control apparatus for controlling the amount of air supplied to the engine and the timing of the sparks supplied to the engine to cause the engine idling speed to follow a target engine idling speed value. In response to a demand for application of a load to the engine, the magnitude of the load to be applied to the engine and the time at which the load is applied to the engine are predicted. After the load application demand is detected, the amount of air supplied to the engine is increased and the spark timing is corrected to produce an engine output condition causing the engine speed to follow the target engine speed value with the use of an engine model indicating an engine output characteristic provided when the spark timing, the amount of air supplied to the engine and the predicted load magnitude are inputted to the engine model.

45 Claims, 14 Drawing Sheets

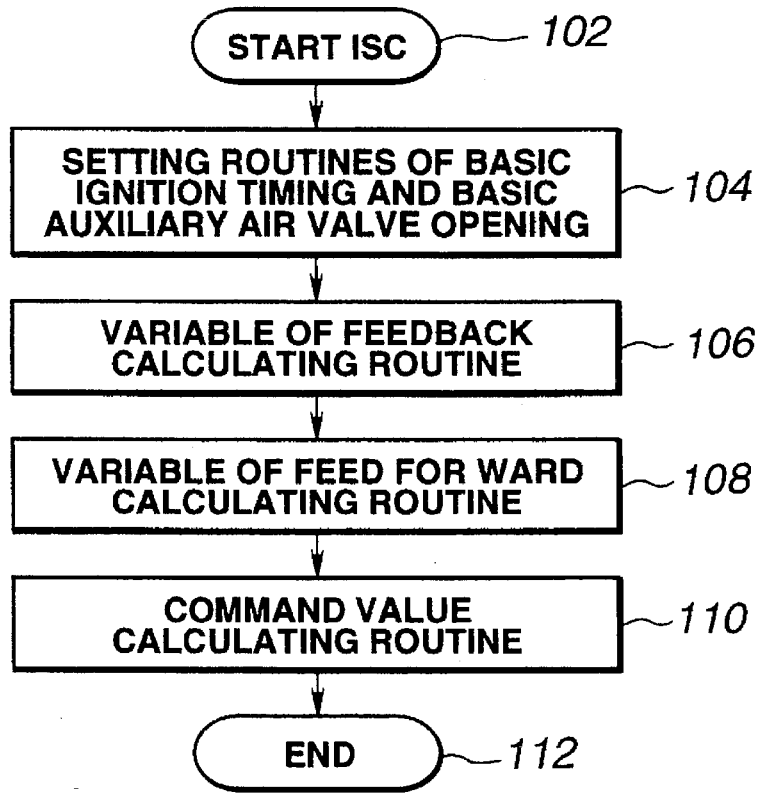
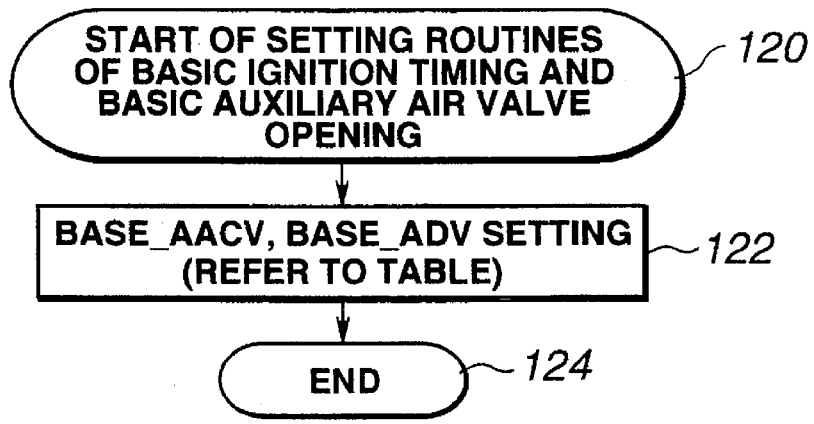

FIG.14A  APPLIED LOAD REQUEST (SHIFT LEVER)
FIG.14B  LOAD (D RANGE LOAD)
FIG.14C  FF4_AACV(t)
FIG.14D  AUXILIARY AIR VALVE OPENING ANGLE
FIG.14E  INTAKE MANIFOLD PRESSURE
FIG.14F  FF4_ADV(t)
FIG.14G  IGNITION TIMING
FIG.14H  ENGINE GENERATION TORQUE
FIG.14I  ENGINE REVOLUTION SPEED

ENGINE IDLING SPEED CONTROL APPARATUS

BACKGROUND OF THE INVENTION

This invention relates to an engine idling speed control apparatus arranged to suppress engine speed changes before and after application of an external load to the engine.

It is the current practice to maintain the engine speed at or near a target value by controlling the amount of air supplied to the engine, the amount of fuel metered to the engine and the ignition timing in a direction to reduce the deviation of the sensed engine speed from the target value. However, such a conventional engine idling speed control cannot avoid an abrupt engine idling speed change resulting from an abrupt engine load change when an air conditioner or other accessory is switched on or off.

It is proposed, in Japanese Patent Kokai No. 61-169642 to avoid such an abrupt engine idling speed change by advancing the ignition timing from a basic value while increasing the amount of air supplied to the engine upon application of an external load to the engine. In order to achieve good response to the external load application, the basic ignition timing value should be set at a value deviated sufficiently from the value MBT to provide a sufficient margin for the torque increase resulting from the ignition timing advancement operation required upon the external load application. In order to achieve good fuel economy, the basic ignition timing value should be set near the value MBT. For this dilemma, it is difficult to achieve good response to an engine load change as well as good fuel economy.

SUMMARY OF THE INVENTION

It is a main object of the invention to provide an improved engine idling speed control apparatus which can provide good response to application of an external load to the engine as well as good fuel economy.

There is provided, in accordance with the invention, an apparatus for controlling the idling speed of an internal combustion engine. The engine idling speed control apparatus comprises first adjustable means for controlling the amount of air supplied to the engine, second adjustable means for controlling the timing of the sparks supplied to the engine, feedback control means for controlling the first and second adjustable means for feedback control of the amount of air supplied to the engine and the timing of the sparks supplied to the engine to cause the engine idling speed to follow a target engine idling speed value, means for detecting a demand for application of a load to the engine, means for increasing the amount of air supplied to the engine after the load application demand is detected, means for predicting the magnitude of the load to be applied to the engine and the time at which the load is applied to the engine when the load application demand is detected, and means for correcting the spark timing to produce an engine output condition causing the engine speed to follow the target engine speed value after the load application demand is detected with the use of an engine model indicating an engine output characteristic provided when the spark timing, the amount of air supplied to the engine and the predicted load magnitude are inputted to the engine model.

In another aspect of the invention, there is provided an apparatus for controlling the idling speed of an internal combustion engine. The engine idling speed control apparatus comprises first adjustable means for controlling the amount of air supplied to the engine, second adjustable means for controlling the timing of the sparks supplied to the engine, feedback control means for controlling the first and second adjustable means for feedback control of the amount of air supplied to the engine and the timing of the sparks supplied to the engine to cause the engine idling speed to follow a target engine idling speed value, means for detecting a demand for application of a load to the engine, means for increasing the amount of air supplied to the engine after the load application demand is detected, means for controlling the load to be applied to the engine, and means for correcting the spark timing to produce an engine output condition causing the engine speed to follow the target engine speed value after the load application demand is detected with the use of an engine model indicating an engine output characteristic provided when the spark timing, the amount of air supplied to the engine and the controlled load are inputted to the engine model.

In still another aspect of the invention, there is provided an apparatus for controlling the idling speed of an internal combustion engine. The engine idling speed control apparatus comprises first adjustable means for controlling the amount of air supplied to the engine, second adjustable means for controlling the timing of the sparks supplied to the engine, feedback control means for controlling the first and second adjustable means for feedback control of the amount of air supplied to the engine and the timing of the sparks supplied to the engine to cause the engine idling speed to follow a target engine idling speed value, means for detecting a demand for application of a load to the engine, means for increasing the amount of air supplied to the engine after the load application demand is detected, means for detecting the load applied to the engine after the load application demand is detected, and means for correcting the spark timing to produce an engine output condition causing the engine speed to follow the target engine speed value after the load application demand is detected with the use of an engine model indicating an engine output characteristic provided when the spark timing, the amount of air supplied to the engine and the detected load are inputted to the engine model.

BRIEF DESCRIPTION OF THE DRAWINGS

This invention will be described in greater detail by reference to the following description taken in connection with the accompanying drawings, in which:

FIG. 3 is an overall flow diagram illustrating the programming of the digital computer used in the engine idling speed control apparatus of FIG. 1;

FIG. 4 is a detailed flow diagram illustrating the programming of the digital computer as it is used to calculate the basic ignition timing and auxiliary air flow values;

DETAILED DESCRIPTION OF THE INVENTION

Figure 1:
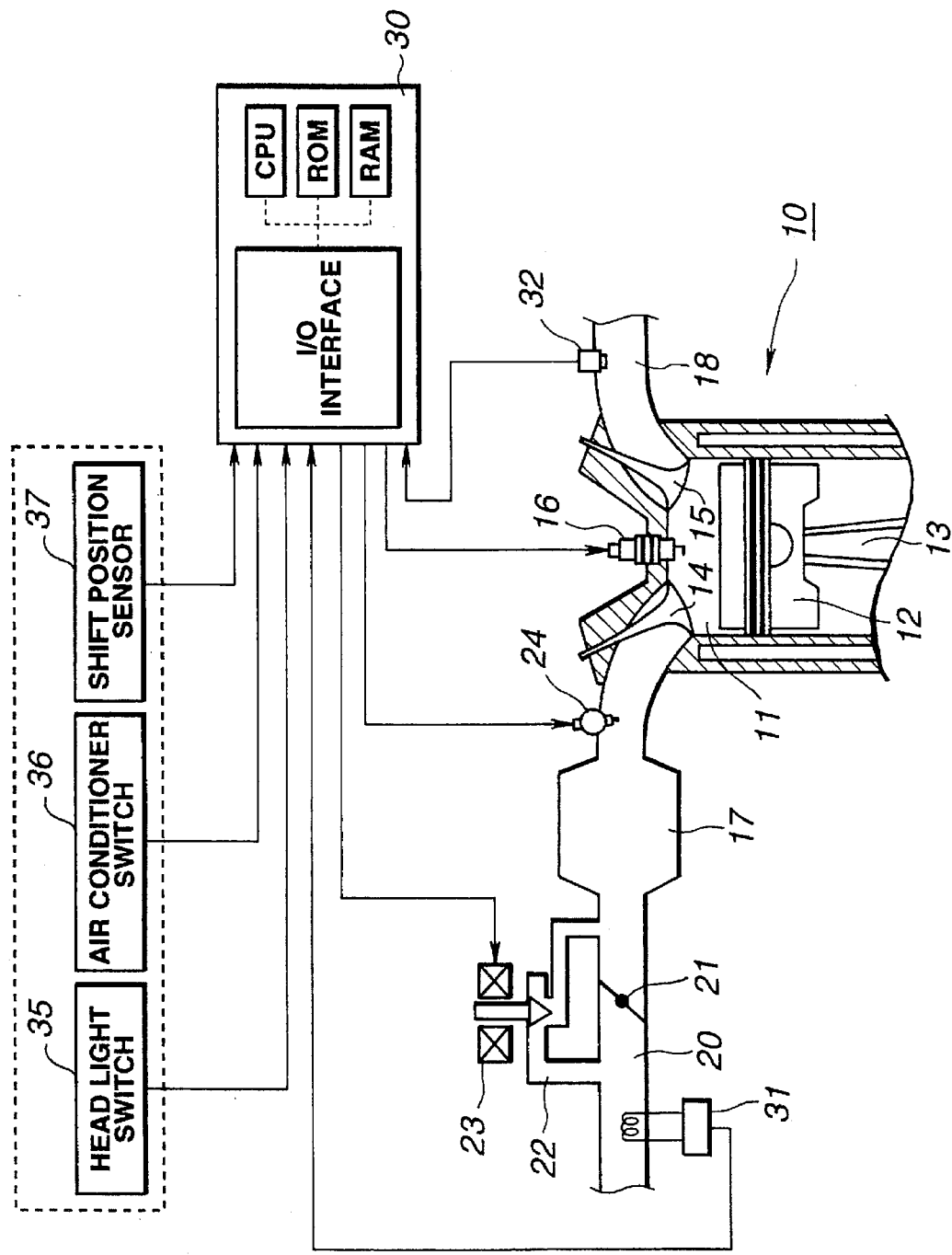
FIG. 1 is a schematic diagram showing one embodiment of an engine idling speed control apparatus made in accordance with the invention.

With reference to the drawings and in particular to FIG. 1, there is sown a schematic diagram of an engine idling speed control apparatus embodying the invention. An internal combustion engine, generally designated by the numeral 10, for an automotive vehicle includes combustion chambers or cylinders, one of which is illustrated at 11. A piston 12 is mounted for reciprocal motion within the cylinder 11. A crankshaft (not shown) is supported for rotation within the cylinder 11. A connecting rod 13, which is pivotally connected to the piston 12 and the crankshaft, is used to produce rotation of the crankshaft in response to reciprocation of the piston within the cylinder 11. An intake manifold 17 is connected with the cylinder 11 through an intake port with which an intake valve 14 is in cooperation for regulating an entry of combustion ingredients into the cylinder 11. A spark plug 16 is mounted in the top of the cylinder 11 for igniting the combustion ingredients within the cylinder 11 when the spark plug 16 is energized by the presence of high voltage electrical energy from an engine control unit 30. An exhaust manifold 18 is connected with the cylinder 11 through an exhaust port with which an exhaust valve 15 is in cooperation for regulating the exit of combustion products, exhaust gases, from the cylinder 11 into the exhaust manifold 18. The intake and exhaust valves 14 and 15 are driven through a suitable linkage with the crankshaft.

Air to the engine 10 is supplied through an induction passage 20. The amount of air permitted to enter the combustion chamber 11 through the intake manifold 17 is controlled by a butterfly throttle valve 21 situated within the induction passage 20. The throttle valve 21 is connected by a mechanical linkage to an accelerator pedal. The degree of rotation of the throttle valve 21 is manually controlled by the operator of the automotive vehicle. An auxiliary air control valve 23 is provided in an auxiliary air passage 22 bypassing the throttle valve 21 to control the amount of air introduced through the bypass passage 22 into the intake manifold 17 at idling conditions where the throttle valve 21 is at or near its closed position. The auxiliary air control valve 23 opens to permit air flow through the auxiliary air passage 22 when it is energized by the presence of an electrical pulse signal fed thereto from the engine control unit 30. The duty factor of the electrical pulse, that is, the ratio of the pulse width to the repetitive period, applied to the auxiliary air control valve 23 determines the length of time the auxiliary air control valve 20 opens during the repetitive period and, thus, determines the amount of air flow through the auxiliary air passage 22 into the intake manifold 17. A fuel injector 24 is connected to a conventional fuel supply system. The fuel injector 24 opens to inject fuel into the intake manifold 17 when it is energized by the presence of electrical current fed from the engine control unit 30. The length of the electrical pulse, that is, the pulse width, applied to the fuel injector 24 determines the length of time the fuel injector opens and, thus, determines the amount of fuel injected into the intake manifold 17.

In the operation of the engine, fuel is injected through the fuel injector 24 toward the intake port of the cylinder 11 and mixed with the air therein. When the intake valve opens, the air-fuel mixture enters the combustion chamber 11. An upward stroke of the piston compresses the air-fuel mixture, which is then ignited by a spark produced by the spark plug 16 in the combustion chamber 11. Combustion of the air-fuel mixture in the combustion chamber 11 takes place, releasing heat energy, which is converted into mechanical energy upon the power stroke of the piston. At or near the end of the power stroke, the exhaust valve opens and the exhaust gases are discharged into the exhaust manifold 18.

The amount of fuel metered to the engine, this being determined by the width of the electrical pulses applied to the fuel injector 24, the amount of air flow through the auxiliary air passage 22, this being determined by the duty ratio of the electrical pulses applied to the auxiliary air control valve 23, and the ignition-system spark timing are repetitively determined to control the idling speed of the engine from calculations performed in the engine control unit 30. These calculations are made based on various conditions of the engine that are sensed during its operation. These sensed conditions include cylinder-head coolant temperature, intake air flow, oxygen concentration, engine battery voltage and engine speed. Thus, a cylinder-head coolant temperature sensor (not shown), a flow meter 31, an oxygen sensor 32, an engine battery voltage sensor (not shown) and a crankshaft position sensor (not shown) are connected to the control unit 11. The cylinder-head coolant temperature sensor preferably is mounted in the engine cooling system and it comprises a thermistor connected in an electrical circuit capable of producing a DC voltage having a variable level proportional to coolant temperature. The flow meter 31 comprises a thermosensitive wire placed in the induction passage 20 upstream of the throttle valve 21 and it produces an analog signal proportional to flow rate. The oxygen sensor 32 is located in the exhaust manifold 18 and it provides a feedback signal indicative of the concentration of the oxygen contained in the exhaust gases discharged from the engine 10. The engine battery voltage sensor produces a signal proportional to the voltage of the engine battery. The crankshaft position sensor produces a series of crankshaft position electrical pulses each corresponding to one degree of rotation of the engine crankshaft and a series of reference electrical pulses at a predetermined number of degree before the top dead center position of each engine piston. The engine control unit 30 also receives signals from various switches including a head light switch 35, an air conditioner switch 36 and a shift position sensor 37. The head light switch 35 is operated between an "on"

and "off" position and it provides current from the car battery to the engine control unit 30 when the head light switch is turned "on" to drive the head lights of the vehicle. The air conditioner switch 36 is operated between an "on" and "off" position and it provides current from the car battery to the engine control unit 30 when the air conditioner switch is turned "on" to drive the air conditioner installed on the vehicle. The shift position sensor 37 is associated with the vehicle transmission and it provide a signal indicative of the gear position selected in the transmission.

The control unit 30 may employ a digital computer which is considered as including a central processing unit (CPU), a read only memory (ROM), a random access memory (RAM) and an input/output interface unit (I/O). The central processing unit communicates with the rest of the computer via data bus. The input/output interface unit includes a counter which counts the reference pulses fed from the crankshaft position sensor and converts its count into an engine speed indication digital signal for application to the central processing unit. The input/output interface unit also includes an analog-to-digital converter which receives analog signals from the flow meter 31, the oxygen sensor 32 and other sensors and converts them into digital form for application to the central processing unit. The read only memory contains the programs for operating the central processing unit and further contains appropriate data in look-up tables used in calculating appropriate values for fuel delivery requirement, auxiliary air flow rate and ignition-system spark timing. Control words specifying desired fuel delivery requirement, auxiliary fuel flow rate and ignition-system spark timing are periodically transferred by the central processing unit to the input/output control unit which converts the received control words into a fuel injection pulse signal for application to the fuel injector 24, an auxiliary air control pulse signal for application to the auxiliary air control valve 23 and a spark plug control signal for application to the spark plug 16.

Figure 2A:
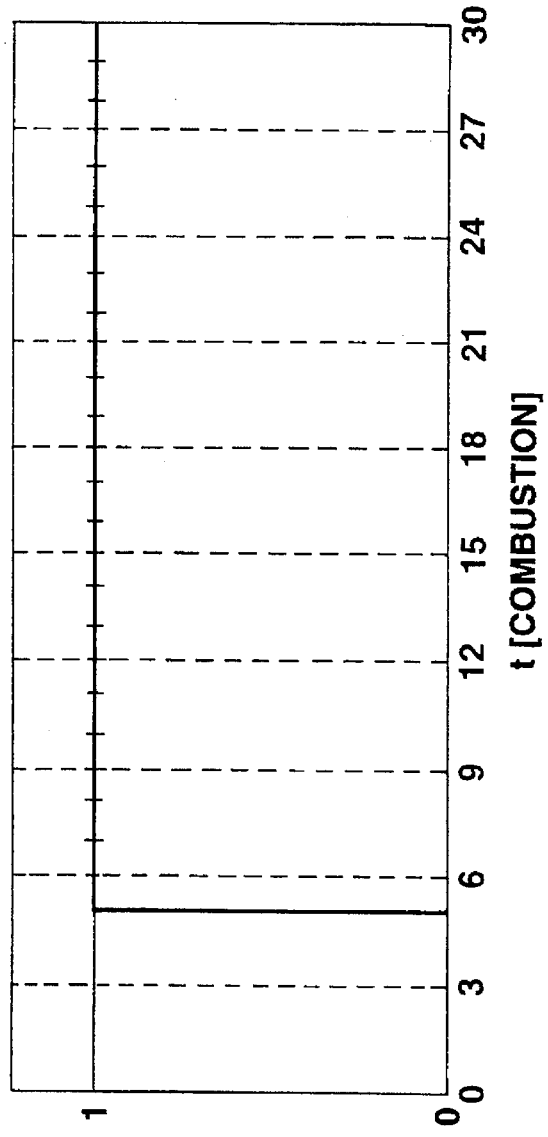
FIGS. 2A and 2B are graph used in explaining the manner to set the target engine speed value before and after application of an external load to the engine.

The target value ne_ref for engine idling speed is calculated based on the engine load and coolant temperature. The engine control unit 30 sets the target value ne_ref at a value ne_ref$_0$ when no air conditioner load is applied to the engine and at a value ne_ref$_1$ when an air conditioner load is applied to the engine. When the air conditioner is changed between its "on" and "off" states, the engine control unit 30 sets the target value ne_ref at a value calculated from the following equation:

$$re\_ref=ne\_ref_0+GM(q^{-1}) (ne\_ref_1-ne\_ref_0) ACSW \quad (1)$$

where $q^{-1}$ is the one combustion delay operand indicating a value $(q^{-1}y(t)=y(t-1))$ calculated one combustion before, ACSW is a factor equal to 1 when the air conditioner switch 36 is "on" and 0 when the air conditioner switch 36 is "off", as shown in FIG. 2A, and $GM(q^{-1})$ is a standard model for setting a desired target response characteristic in the form of a second-order digital filter given as:

$$GM(q^{-1})=(0.06+0.12q^{-1}+0.06q^{-2})/(1-1.02q^{-1}+0.26) \quad (2)$$

Figure 2B:
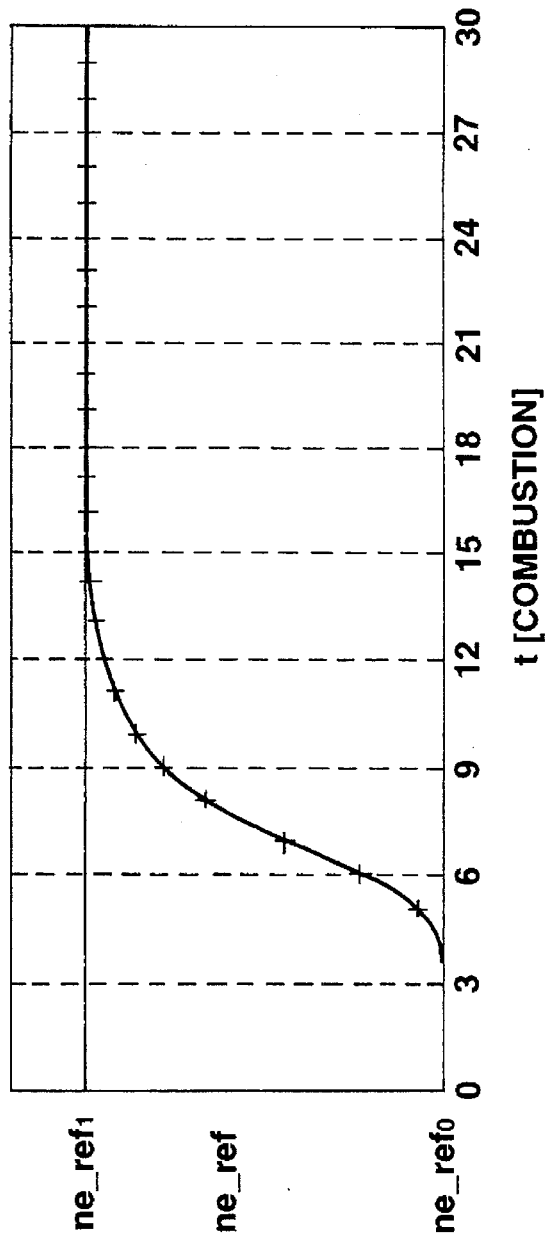

The calculated target idling engine speed is sown in FIG. 2B.

FIG. 3 is an overall flow diagram illustrating the programming of the digital computer as it is used to calculate the required fuel delivery requirement in the form of fuel-injection pulse-width, the required ignition-timing and the required auxiliary air flow in the form of valve-drive duty-ratio. The computer program is entered at the point 102 at uniform intervals. At the point 104 in the program, the central processing unit calculates the basic ignition-timing value and the basic auxiliary air flow values. At the point 106, correction factors used for the feedback control of the fuel delivery requirement, ignition timing and auxiliary air flow are calculated. At the point 108, correction factors used for the feedforward control of the fuel delivery requirement, ignition timing and auxiliary air flow are calculated. At the point 110 in the program, the required fuel delivery requirement, ignition timing and auxiliary air flow are calculated and transferred to the input/output control unit. Folk owing this, the program proceeds to the end point 112.

FIG. 4 is a flow diagram illustrating the above calculation of the basic ignition timing and auxiliary air flow values. At the point 120 in FIG. 4, which corresponds to the point 104 of FIG. 3, the computer program is entered. At the point 122, the basic ignition timing and auxiliary air flow values (BASE_ADV) and (BASE_AACV) are calculated from relationships programmed into the computer. These relationships specify these controlled variables as a function of engine coolant temperature and engine load. Following this, the program proceeds to the end point 124.

Figure 5:
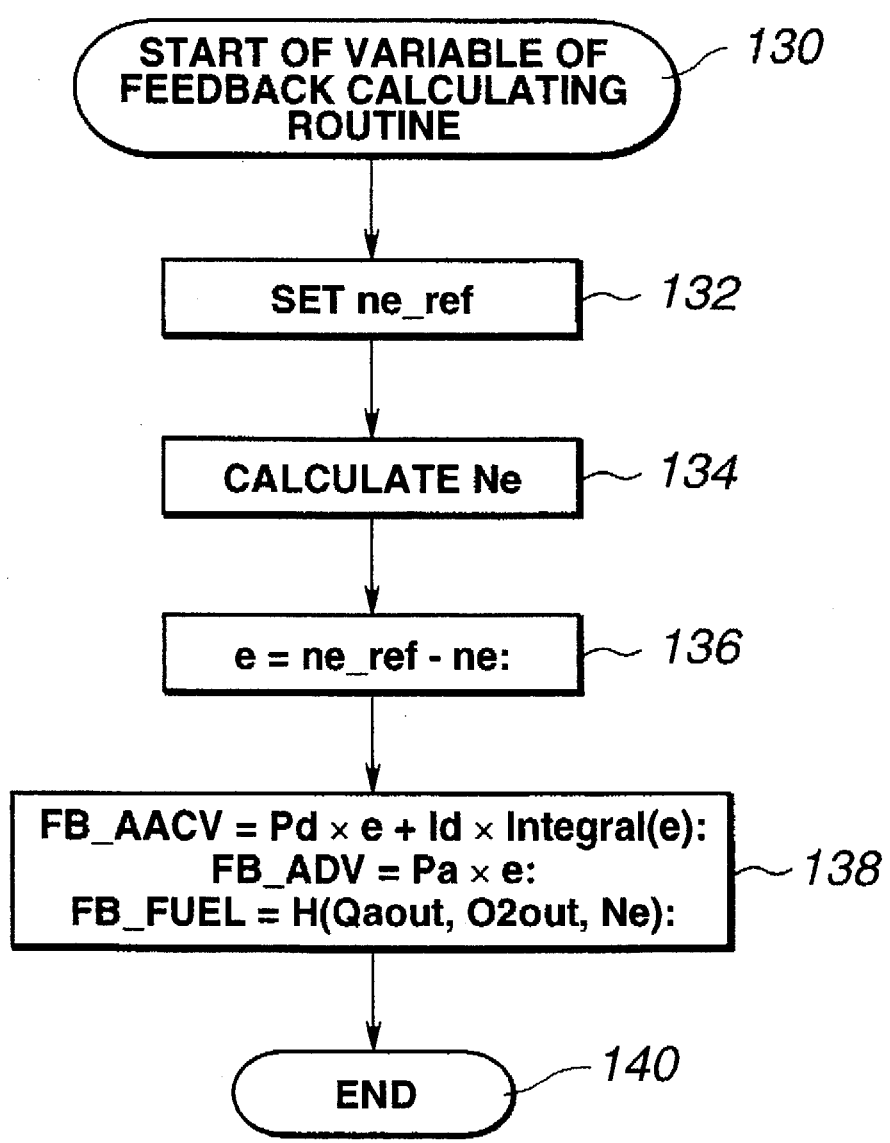
FIG. 5 is a detailed flow diagram illustrating the programming of the digital computer as it is used to calculate the correction factors used for feedback control of auxiliary air flow, ignition timing and fuel delivery requirement.

FIG. 5 is a flow diagram illustrating the above calculation of the correction factors used for feedback control of auxiliary air flow, ignition timing and fuel delivery requirement. At the point 130 in FIG. 5, which corresponds to the point 106 of FIG. 3, the computer program is entered. At the point 132, the target engine speed ne_ref is calculated. At the point 134, the engine speed Ne is read into the computer memory. At the point 136, a difference e of the calculated target engine speed ne_ref from the actual engine speed Ne. At the point 138 in the program, the correction factors FB_AACV and FB_ADV are calculated for feedback control of auxiliary air flow and ignition timing. In greater detail, the correction factor FB_AACV used for auxiliary air flow feedback control is calculated as:

$$FB\_AACV=Pd\times e+Id\times Integral \quad (e)$$

The correction factor FB_ADV used lot ignition-timing feedback control is calculated as:

$$FB\_ADV=Pa\times e$$

The correction factor F_B FUEL used for fuel delivery requirement feedback control is calculated as:

$$FB\_FUEL=H (Qaout, O2out, Ne)$$

where Qaout is the output from the airflow meter 31, Q2out is the output from the O2 sensor 32, and Ne is the sensed engine speed. Following this, the program proceeds to the end position 140.

Figure 6:
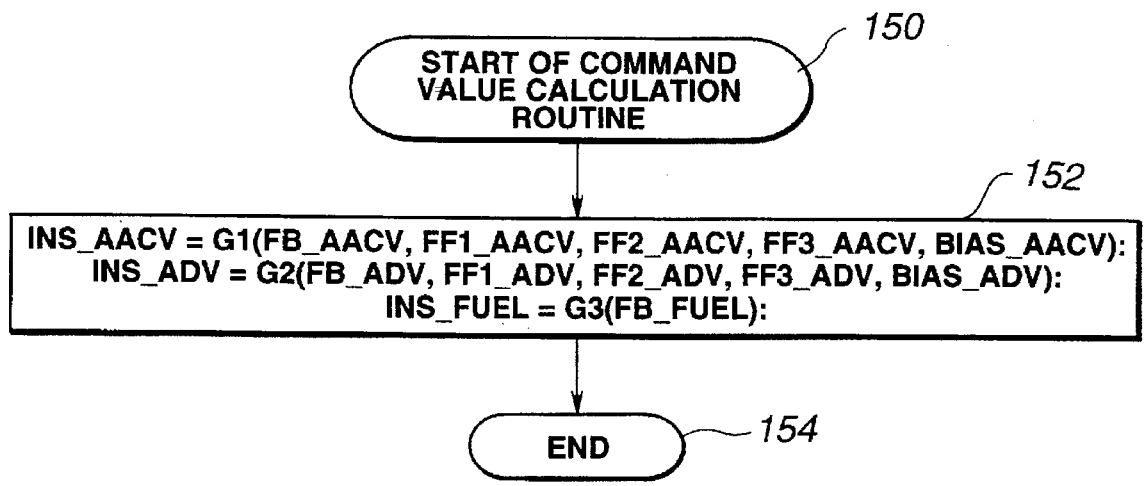
FIG. 6 is a detailed flow diagram illustrating the programming of the digital computer as it is used to calculate the command values used for auxiliary-air, ignition-timing and fuel-delivery control.

FIG. 6 is a flow diagram illustrating the above calculation of the command values used for auxiliary-air, ignition-timing and fuel-delivery control. At the point 150 in FIG. 6, which corresponds to the point 110 of FIG. 3, the computer program is entered. At the point 152, the command values INS_AACV, INS_ADV and INS_FUEL used for auxiliary-air, ignition-timing and fuel-delivery control are calculated from the following equations:

$$INC\_AACV=G1(FB\_AACV, FF1\_AACV, FF2\_AACV, FF3\_AACV, BIAS\_AACV)$$

$$INS\_ADV=G2(FB\_ADV, FF1\_ADV, FF2\_ADV, FF3\_ADV, BIAS\_ADV)$$

$$INS\_FUEL=G3(FB\_FUEL)$$

Following this, the program proceeds to the end point 154.

Figure 7:
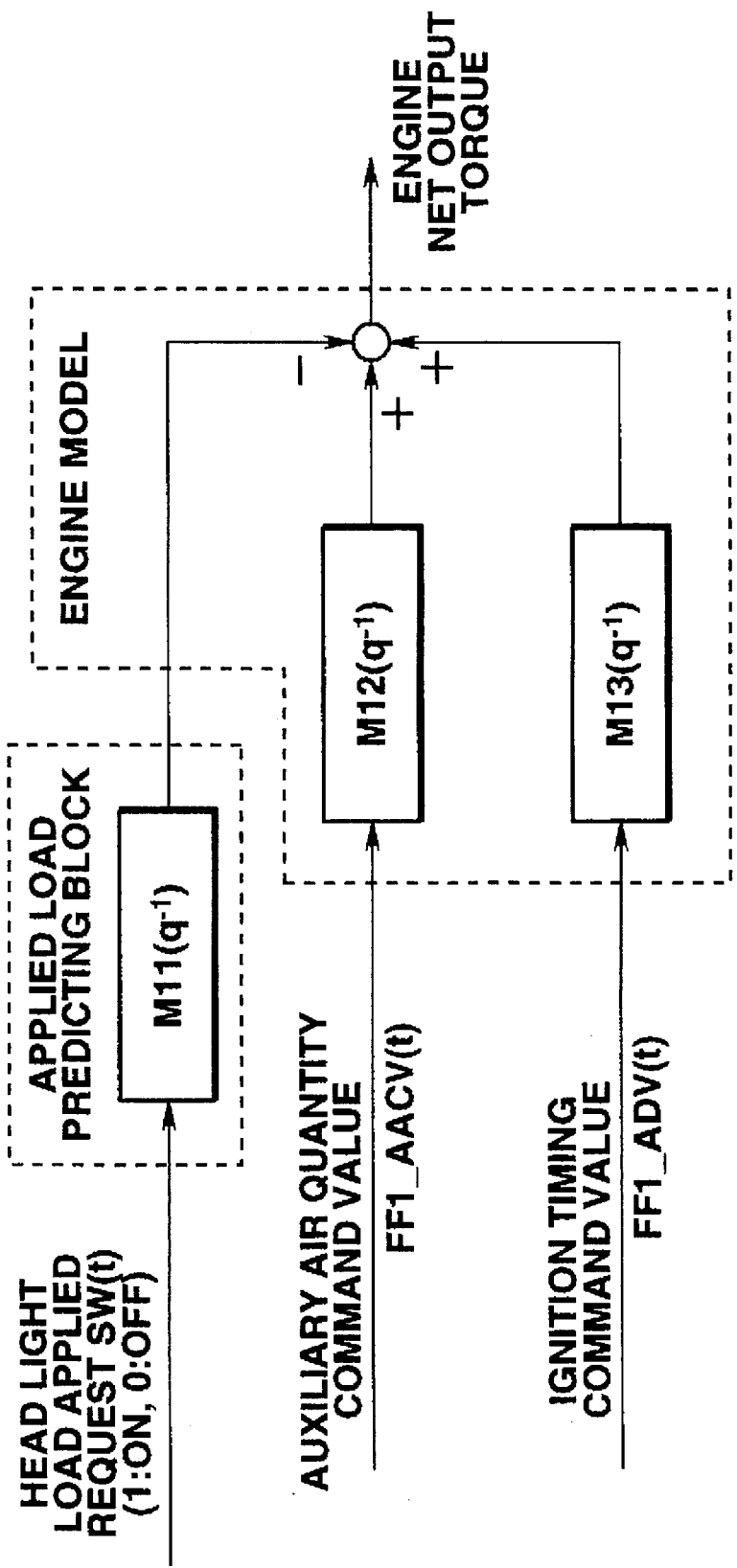
FIG. 7 is a block diagram showing an engine model used in the engine idling speed control apparatus of the invention to calculate engine net output torque.
Figure 8:
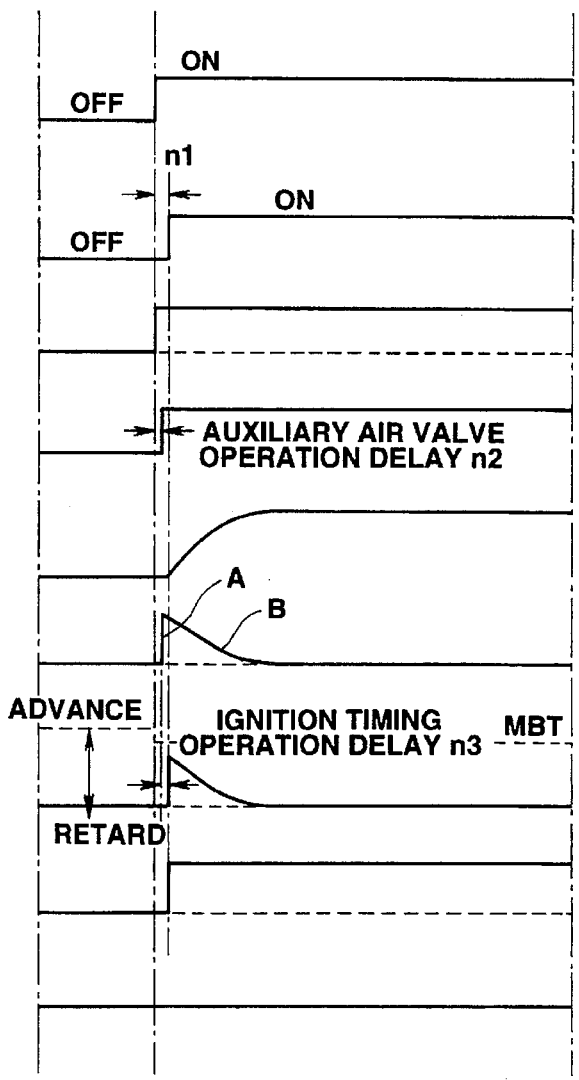
FIGS. 8A to 8I are graphs used in explaining the operation of the engine idling speed control apparatus of the invention.

Referring to FIG. 7, the calculation of the feedforward control correction factors for the head light load will be described on such assumptions that the head light load is applied to the engine after a small delay n1 (FIG. 8B) in response to a change of the head light switch 35 from its OFF position to its ON position (FIG. 8A), that the target engine speed ne_ref remains unchanged at a value ne_ref$_0$ (FIG. 8I) before and after the application of the head light load and that the basic ignition timing BASE_ADV remains unchanged before and after the application of the head light load. The linear engine model receives the ignition timing, the auxiliary air flow and the load predicted to be applied to the engine and it outputs net engine output torque. The load predicted to be applied to the engine is transferred to the engine model from an applied load predicting block which receives a demand SW(t) for application of the head light load to the engine. This demand SW(t) is 0 when the head light switch 35 is "off" and 1 when the head light switch 35 is "on". The applied load predicting block employs a transfer characteristic $M11(q^{-1})$ which indicates a dynamic behavior during the interval between the time at which the demand SW(t) occurs and the time at which the head light load is applied to the engine. In order that the head light load is applied to the engine after a small delay n1 in response to the demand for application of the head light load, the transfer characteristic $M11(q^{-1})$ is given from the following equation:

$$M11(q^{-1}) = K1 \cdot q^{-n1} \quad (3)$$

where n1 is the delay and K1 is again element.

The engine model employs a transfer characteristic $M12(q^{-1})$ which indicates a dynamic behavior from the auxiliary air correction factor FF1_AACV(t) to the engine net output torque. This transfer characteristic $M12(q^{-1})$ is calculated from the following equation:

$$M12(q^{-1}) = K2 \cdot q^{-n2}/(1 + a1 \cdot q^{-1}) \quad (4)$$

where n2 is the delay of operation of the auxiliary air control valve 23 in response to a control signal applied thereto, K2 is a gain element and a1 is a coefficient. The engine model also employs another transfer characteristic $M13(q^{-1})$ which indicates a dynamic behavior from the ignition timing correction factor FF1_ADV(t) to the engine net output torque. This transfer characteristic $M13(q^{-1})$ is calculated from the following equation:

$$M13(q^{-1}) = K3 \cdot q^{-n3} \quad (5)$$

where n3 is the delay of operation of the spark plug 16 in response to a control signal applied thereto and K3 is a gain element. The engine net output torque T is given as:

$$\begin{aligned} T &= K1 \cdot q^{-n1} \cdot SW(t) + \\ &\quad K2 \cdot q^{-n2}/(1 + a1 \cdot q^{-1}) \cdot FF1\_AACV(t) + \\ &\quad K3 \cdot q^{-n3} \cdot FF1\_ADV \\ &= M11(q^{-1}) \cdot SW(t) + \\ &\quad M11(q^{-1}) \cdot FF1\_AACV(t) + \\ &\quad M11(q^{-1}) \cdot FF1\_ADV(t) \end{aligned} \quad (6)$$

Figure 15:
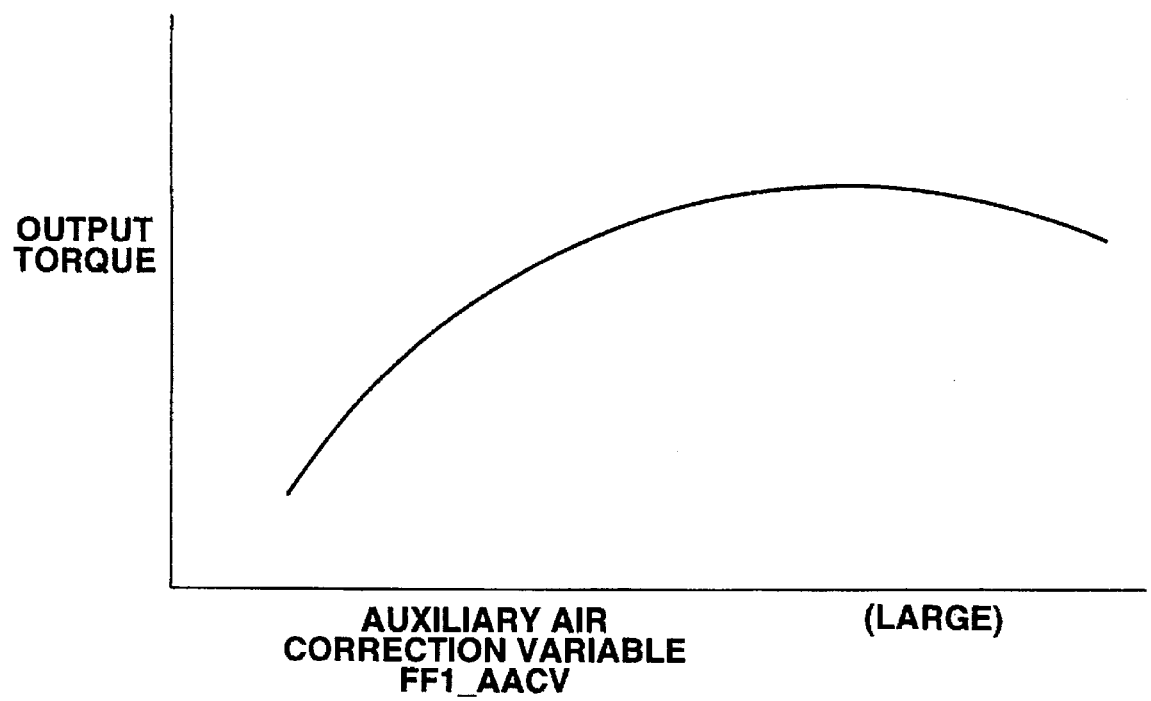
FIG. 15 is a graph of engine output torque versus correction factor.

While the model of FIG. 7 is arranged to output the engine net output torque, it is to be understood that the model may be modified to output the engine speed. While the invention has been described in a linear model, it is to be understood that a non-linear model may be used for the same purpose. In this case, the relationship between the uotput torque and the correction factor (illustrated case FF1_AACV) may be shown in FIG. 15.

Since the head light load is changed in a stepped form in this case, the auxiliary air flow difference (correction factor) FF1_AACV(t), which is required to maintain the target engine speed unchanged before and after the load is applied to the engine, is set in a stepped form upon detection of a demand for load application. This difference FF1_AACV(t) is calculated from the following equation:

$$FF1\_AACV(t) = M11(1)/M12(1) \cdot SW(t) \quad (7)$$

The ignition timing correction factor FF1_ADV(t) is set in a manner to follow the target engine speed, that is, to maintain the model output (engine net output torque) at zero, from the following equation:

$$FF1\_ADV(t) = \{M11(q^{-1}) \cdot SW(t) - M12(q^{-1}) \cdot FF1\_AACV(t)\}/M13(q^{-1})) \quad 8)$$

Description will be made in connection of the phase A (FIG. 8F) of the ignition timing correction factor FF1_ADV (t). When the engine control unit 30 detects a demand for load application to the idling engine, that is, when the head light switch 35 changes from its "off" position to its "on" position at idle engine operation (FIG. 8A), a command is produced to increase the degree of opening of the auxiliary air control valve 23 by a predetermined value (M11(1)/M12 (1)). The ignition timing of the spark plug 16 is advanced at a predetermined time, as indicated by the FF1_ADV(t) of Equation (8).

Description will be made in connection of the phase B (FIG. 8F) of the ignition timing correction factor FF1_ADV (t). When the head light load is in the "on" state (FIG. 8B), the degree of opening of the auxiliary air control valve 23 is held at a value AACV_AC(t) (M11(1)/M12(1)) and the ignition timing correction factor decreases to a predetermined value according to FF1_ADV(t) of equation (8).

Since the auxiliary-air and ignition-timing correction factors are set in such a manner as to maintain the engine net output torque around zero, it is possible to certainly suppress engine speed fluctuations. Since the ignition timing is retarded during load application to the engine, it is possible to ensure a sufficient output torque margin for ignition timing control. Since the basic ignition timing is set toward the maximum torque production side, it is possible to reduce fuel consumption.

Figure 9:
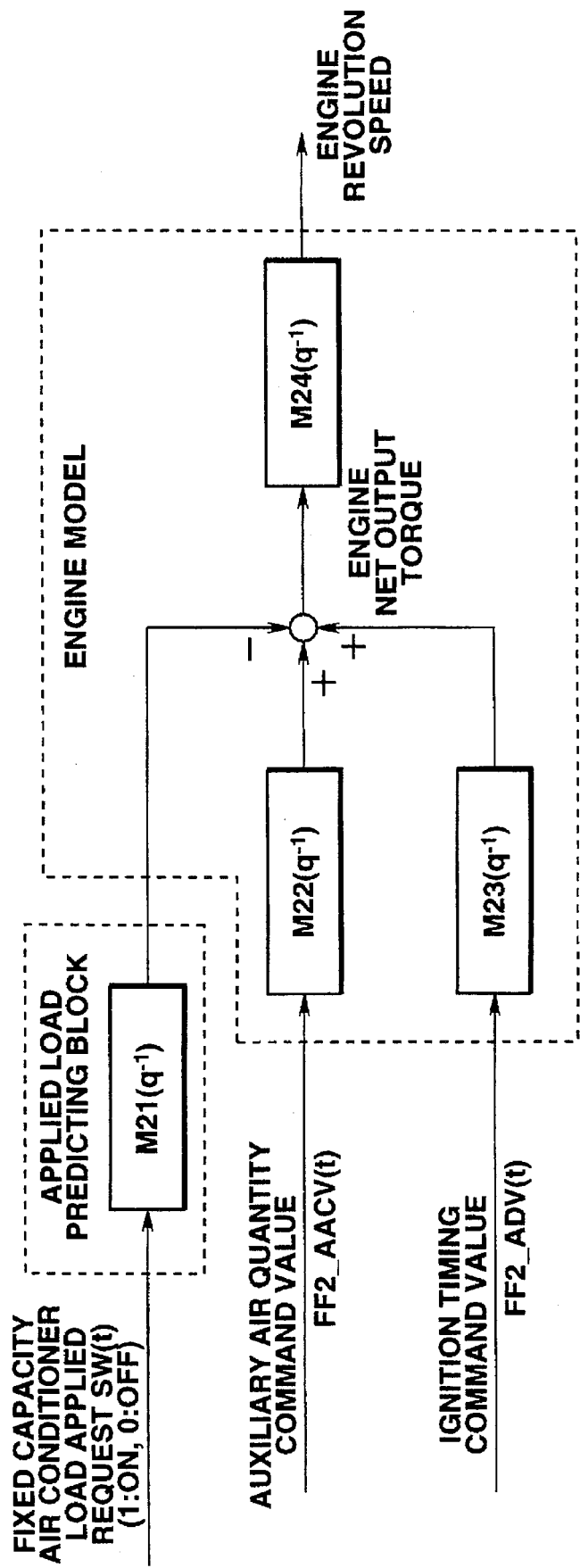
FIG. 9 is a block diagram showing an engine model used in a modified form of the engine idling speed control apparatus of the invention to calculate engine speed.
Figure 10:
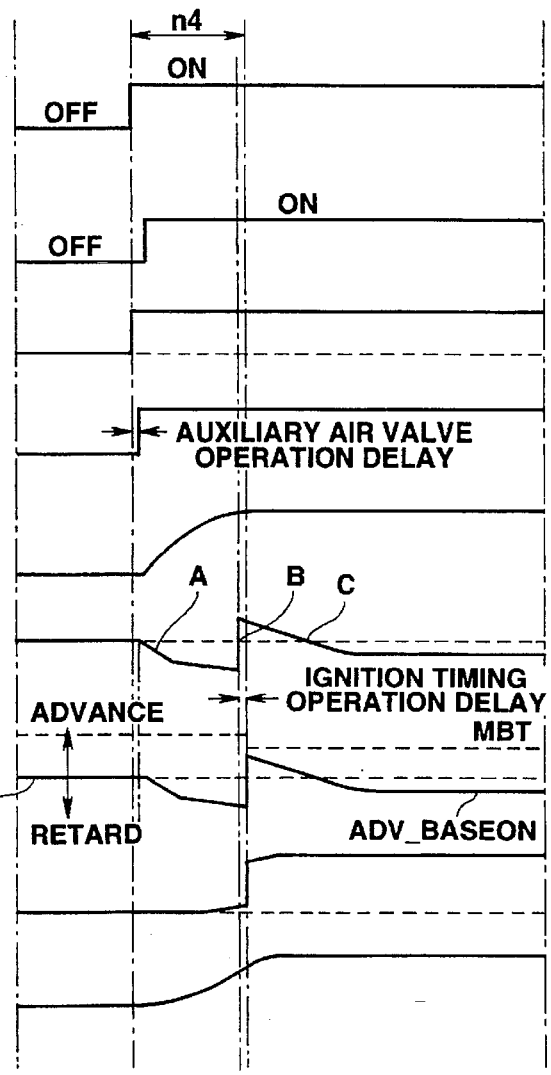
FIGS. 10A to 10I are graphs used in explaining the operation of the modified engine idling speed control apparatus of the invention.

Referring to FIG. 9, the calculation of the feedforward control correction factors for an air conditioner (fixed capacity air compressor) load will be described on such assumptions that the air conditioner load is applied to the engine after a small delay n4 (FIG. 10B) in response to a change of the air conditioner switch 36 from its OFF position to its ON position (FIG. 10A), that the target engine speed ne_ref changes, as shown in FIG. 2A, in response to a change of the air conditioner switch 36, as shown in FIG. 2A, and that the basic ignition timing is set at the value BASE_ADV when the air conditioner switch is at its "off" position and at a value ADV_BASEON when the air conditioner switch is at its "on" position.

The linear engine model receives the ignition timing, the auxiliary air flow and the load predicted to be applied to the engine and it outputs net engine speed. The load predicted to be applied to the engine is transferred to the engine model from an applied load predicting block which receives a demand SW(t) for application of the air conditioner load to the engine. This demand SW(t) is 0 when the air conditioner switch 36 is "off" and 1 when the air conditioner switch 36 is "on". The applied load predicting block employs a transfer characteristic M21 ($q^{-1}$) which indicates a dynamic behavior during the interval between the time a which the demand SW(t) occurs and the time at which the air conditioner load is applied to the engine. The model (transfer characteristic) $M21(q^{-1})$ is given from the following equation:

$$M21(q^{-1}) = K4 \cdot q^{-n4} \qquad (9)$$

where n4 is the delay of application of the air conditioner load after the air conditioner switch is turned "on" and K4 is a gain element.

The engine model employs a transfer characteristic M22 $(q^{-1})$ which indicates a dynamic behavior from the auxiliary air correction factor FF2__AACV(t) to the engine net output torque, a transfer characteristic $M23(q^{-1})$ which indicates a dynamic behavior from the ignition timing correction factor FF2__ADV(t) to the engine net output torque, and a transfer characteristic $M24(q^{-1})$ which indicates a dynamic behavior from the engine net output torque to the engine speed. These transfer characteristics $M22(q^{-1})$ and $M23(q^{-1})$ may be calculated as described in connection with FIG. 7.

While the model of FIG. 9 is arranged to output the engine speed, it is to be understood that the model may be modified to output the engine net output torque. While the invention has been described in a linear model, it is to be understood that a non-linear model may be used for the same purpose.

Since the air conditioner load is changed in a stepped form in this case, the auxiliary air flow correction factor FF2__AACV(t), which is required to maintain the target engine speed unchanged before and after the load is applied to the engine, is set in a stepped form after detection of a demand for load application. This correction factor FF2__AACV(t) is calculated from the following equation:

$$FF2\_AACF(t) = (ne\_ref_1 - ne\_ref_0)/M24(1) + M21(1) + \qquad (10)$$

$$M23(1) \cdot (BASE\_ADV - BASE\_ADV0N)/M22(1)$$

The ignition timing correction factor FF2__ADV(t) is set in a manner to cause the target engine speed to follow the path of change of the target engine speed. Thus, this correction factor is set by solving such an equation specifying the model output held equal to the path of change of the target engine speed, as given by the following equation:

$$FF2\_ADV(t) = \{(ne\_ref_1 - ne\_ref_0)GM(q^{-1}) \cdot SW(t)/M24(q^{-1}) + \qquad (11)$$

$$M21(q^{-1}) \cdot SW(t) - M22(q^{-1}) \cdot FF2\_AACV(t)\}/M23(q^{-1})$$

where $M24(q^{-1})$ is a model (second-order transfer characteristic) indicating a dynamic behavior from the engine speed to the engine net output torque and given as:

$$M24(q^{-1}) = (b_0 q^{-1} + b_1 q^{-2})/(1 + a_1' \cdot q^{-1} + a_2' \cdot q^{-2}) \qquad (12)$$

where $a_1'$, $a_2'$, $b_0$ and $b_1$ are coefficients.

Description will be made in connection of the phase A (FIG. 10F) of the ignition timing correction factor FF2__ADV(t). When the engine control unit 30 detects a demand for load application to the idling engine, that is, when the air conditioner switch 36 changes from its "off" position to its "on" position at idle engine operation (FIG. 10A), the engine control unit 30 produces a command to increase the degree of opening of the auxiliary air control valve 23 by a predetermined value and at the same time measures the time required for the air conditioner load is applied to the engine after the air conditioner switch 36 changes to its "on" position. The ignition timing of the spark plug 16 is retarded, according to the measured time, to an extent corresponding to the correction factor FF2__ADV(t) calculated from Equation (11). Thereafter, the auxiliary air correction factor is held at the value FF2__AACV(t) calculated from Equation (10).

Description will be made in connection of the phase B (FIG. 10F) of the ignition timing correction factor FF2__ADV(t). The ignition timing is controlled to be advanced so as to coincide the time at which the air conditioner load is applied to the engine with the time at which the engine output increases because of the ignition timing control.

Description will be made in connection of the phase C (FIG. 10F) of the ignition timing correction factor FF2__ADV(t). The auxiliary air correction factor is held at a value FF2__AACV(t) calculated from Equation (10) and the ignition timing correction factor decreases according to FF2__ADV(t) of Equation (11) to retard the ignition timing to the reference value for the air conditioner being turned off.

Since the auxiliary-air and ignition-timing correction factors are set in such a manner as to cause the engine speed to follow the path of change of the target engine speed, it is possible to certainly suppress engine speed fluctuations. Since the ignition timing retarded when the load is applied to the engine, it is possible to ensure a sufficient output torque margin for ignition timing control. Since the basic ignition timing is set toward the maximum torque production side, it is possible to reduce fuel consumption.

The invention is also applicable to the case where the air conditioner load cannot be controlled directly by the engine control unit 30. The calculation of the feedforward control correction factors for the air conditioner load will be described with reference to FIG. 11. It is now assumed the air conditioner load is applied to the engine after a small delay n5 in response to a change of the air conditioner switch 36 from its "off" position to its "on" position (FIG. 12A), that the target engine speed ne__ref remains unchanged at a value ne__ref$_0$ before and after the application of the air conditioner load to the engine and that the basic ignition timing BASE__ADV remains unchanged before and after the application of the air conditioner load to the engine. The linear engine model receives the ignition timing, the auxiliary air flow and the load predicted to be applied to the engine and it outputs net engine output torque. The load predicted to be applied to the engine is transferred to the engine model from an applied load predicting block which receives a demand SW(t) for application of the air conditioner load to the engine. This demand SW(t) is 0 when the air conditioner switch 36 is "off" and 1 when the air conditioner switch 36 is "on". The applied load predicting block employs a transfer characteristic $M31(q^{-1})$ which is a model indicating the load torque applied a predetermined time after the air conditioner switch 36 is turned "on". The transfer characteristic $M31(q^{-1})$ is given from the following equation:

$$M31(q^{-1}) = K5 \cdot q^{-n5} \qquad (13)$$

where n5 is the delay of application of the air conditioner load to the engine in response to a change of the air conditioner switch 36 to its "on" position and K5 is a gain element.

The engine model employs a transfer characteristic M32 $(q^{-1})$ which indicates a dynamic behavior from the auxiliary air correction factor to the engine net output torque and a transfer characteristic $M33(q^{-1})$ which indicates a dynamic behavior from the ignition timing correction factor to the engine net output torque.

Figure 11:
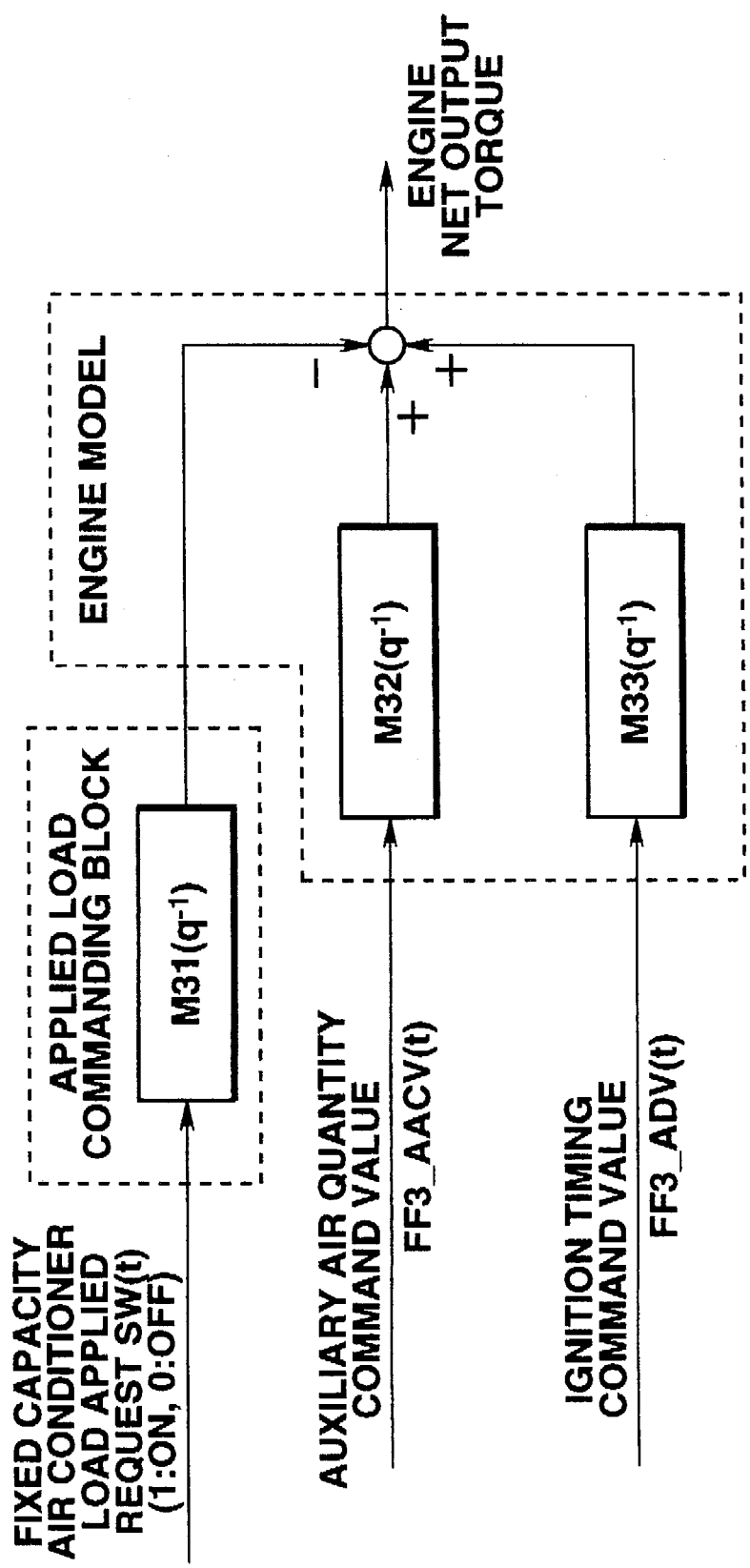
FIG. 11 is a block diagram showing an engine model used in another modified form of the engine idling speed control apparatus the invention to calculate engine net output torque.
Figure 12:
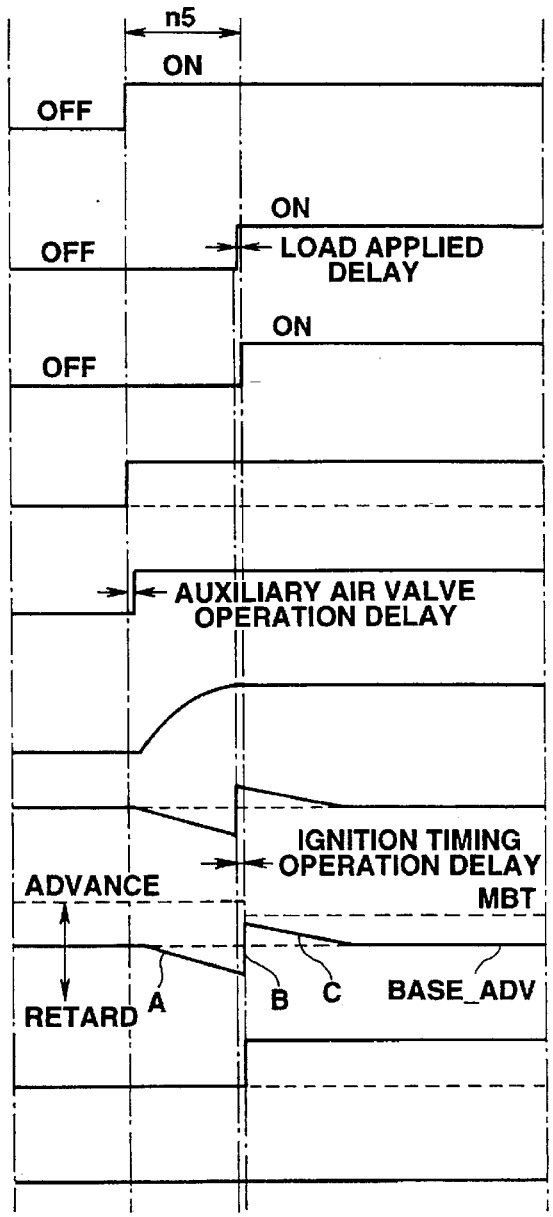
FIGS. 12A to 12J are graphs used in explaining the operation of the modified engine idling speed control apparatus of the invention.

While the model of FIG. 11 is arranged to output the engine net output torque, it is to be understood that the model may be modified to output the engine speed. While the invention has been described in a linear model, it is to be understood that a non-linear model may be used for the same purpose.

Since the air conditioner load is changed in a stepped form in this case, the auxiliary air flow difference (correction factor) FF3__AACV(t), which is required to maintain the target engine speed unchanged before and after the load is applied to the engine, is set in a stepped form upon detection of a demand for load application. This difference FF3__AACV(t) is calculated from the following equation:

$$FF3\_AACV(t) = M31(1)/M32(1) \cdot SW(t) \quad (14)$$

The ignition timing correction factor FF3__ADV(t) is set in a manner to follow the target engine speed, that is, to maintain the model output (engine net output torque) at zero, from the following equation:

$$FF3\_ADV(t) = \{M31(q^{-1}) \cdot SW(t) - M32(q^{-1}) \cdot FF3\_AACV(t)\}/M33(q^{-1})) \quad (15)$$

Description will be made in connection of the phase A (FIG. 12H) of the ignition timing correction factor FF3__ADV(t). When the engine control unit 30 detects a demand for load application to the idling engine, that is, when the air conditioner switch 36 changes from its "off" position to its "on" position at idle engine operation (FIG. 12A), the engine control unit 30 produces a command to increase the degree of opening of the auxiliary air control valve 23 by a predetermined value M32(1)/M32(1) and at the same time measures the time required for the air conditioner load is applied to the engine after the air conditioner switch 36 changes to its "on" position. The ignition timing correction factor FF3__ADV(t) is set according to the measured time. Thereafter, the auxiliary air correction factor is held at the value M31(1)/M32(1).

Description will be made in connection of the phase B (FIG. 12H) of the ignition timing correction factor FF3__ADV(t). The air conditioner load is applied to the engine after the delay n5 in response to a demand for application of the load to the engine. The ignition timing is controlled to be advanced so as to coincide the time at which the air conditioner load is applied to the engine with the time at which the engine output increases because of the ignition timing control.

Description will be made in connection of the phase C (FIG. 12H) of the ignition timing correction factor FF3__ADV(t). The auxiliary air correction factor is held at a value M31(1)/M32(1) and the ignition timing correction factor decreases according to FF3__ADV(t) of Equation (15) to retard the ignition timing to the reference value for the air conditioner being turned on.

Since the auxiliary-air and ignition-timing correction factors are set in such a manner as to maintain the engine net output torque near zero, it is possible to certainly suppress engine speed fluctuations. Since the ignition timing is retarded when the load is applied to the engine, it is possible to ensure a sufficient output torque margin for ignition timing control. Since the basic ignition timing is set toward the maximum torque production side, it is possible to reduce fuel consumption. Since the delay of the load control in response to a demand for application of the load to the engine can be changed, it is possible to prevent the ignition from being detected by the advance side limiter by applying the load to the engine after the ignition timing is retarded to a sufficient extent. It is also possible to improve the control performance by applying the load to the engine in synchronism with the combustion timing.

The calculation of the feedforward control correction factors for the D range load applied to the engine when the D range is selected in the automatic transmission (AT) will be described with reference to FIG. 13. It is now assumed the D range load is applied to the engine after a small delay in response to a change of the shift position sensor 37 from its "off" state to its "on" state (FIG. 17A). The time at which the D range load is applied to the engine is sensed by an oil pressure sensor. In greater detail, the operator places the shift lever into a desired shift position. The shift position sensor 37 provides an "off" signal when the shift lever is in the neutral (N) or park (P) range and an "on" signal when the shift lever is in the drive, third, second or first range. The engine control unit 30 detects a demand for application of the load to the engine when the output of the shift position sensor 37 changes from its "off" state to its "on" state. It is also assumed that the target engine speed ne__ref remains unchanged at a value ne__ref$_0$ before and after the application of the D range load to the engine and that the basic ignition timing BASE__ADV remains unchanged before and after the application of the D range load to the engine. The linear engine model receives the ignition timing, the auxiliary air flow and the load predicted to be applied to the engine and it outputs net engine output torque. The load predicted to be applied to the engine is transferred to the engine model from an applied load predicting block which receives a demand SW(t) for application of the D range load to the engine. This demand SW(t) is 0 when the shift position sensor 37 is "off" and 1 when the shift position sensor 37 is "on". The applied load predicting block employs a transfer characteristic M41($q^{-1}$) which is a function indicating the load characteristic after the shift position sensor 37 changes to its "on" state. The load is given as M41(q-1)·SW(t) where SW(t) is the signal fed from the shift position sensor 37. D range load detection signal. The load may be measured directly if possible. The engine model employs a transfer characteristic M42($q^{-1}$) which indicates a dynamic behavior from the auxiliary air correction factor to the engine net output torque and transfer characteristic M43($q^{-1}$) which indicates a dynamic behavior from the ignition timing correction factor to the engine net output torque.

Figure 13:
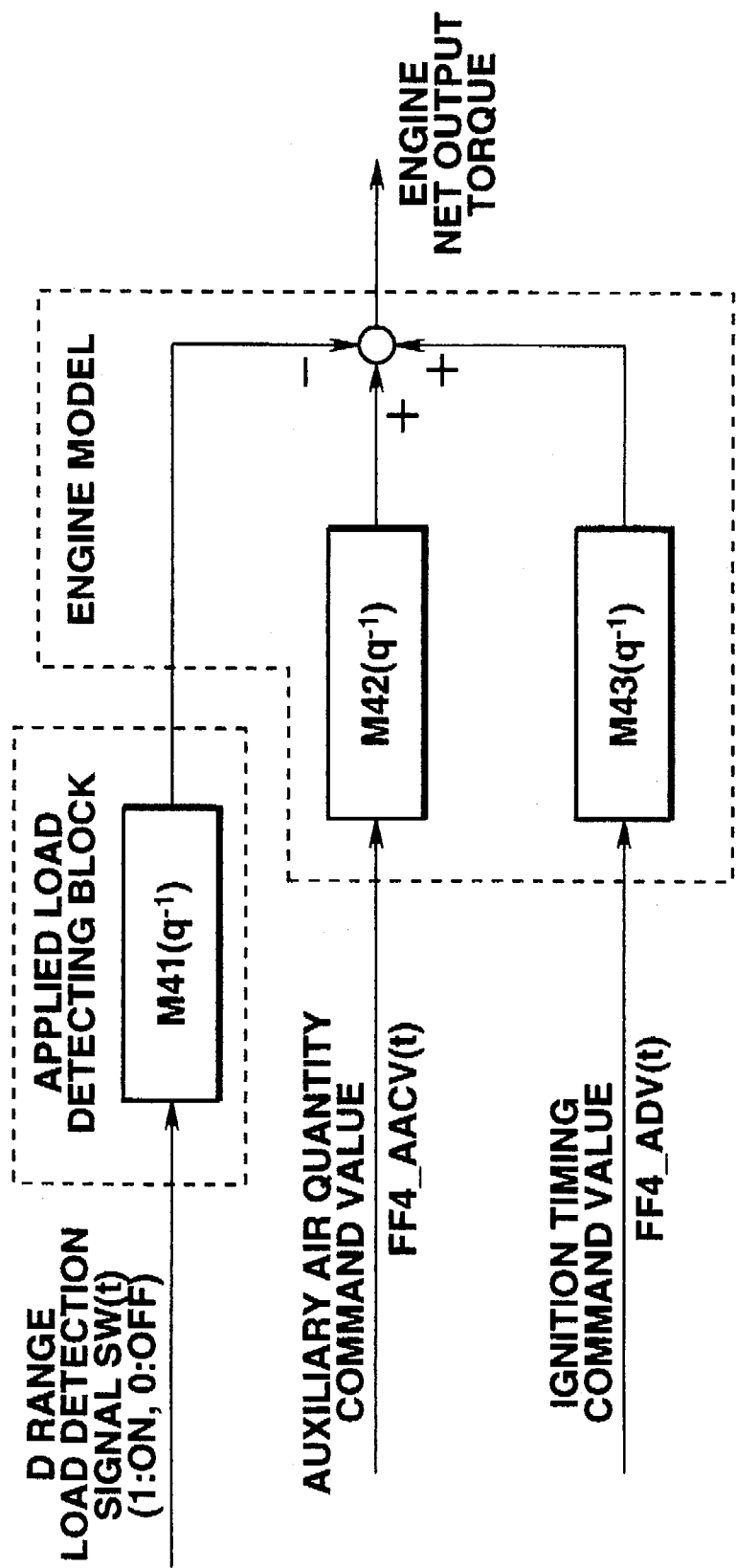
FIG. 13 is a block diagram showing an engine model used in still another modified form of the engine idling speed control apparatus of the invention to calculate engine net output torque.

While the model of FIG. 13 is arranged to output the engine net output torque, it is to be understood that the model may be modified to output the engine speed. While the invention has been described in a linear model, it is to be understood that a non-linear model may be used for the same purpose.

The auxiliary air flow difference (correction factor) FF4__AACV(t), which is required to maintain the target engine speed unchanged before and after the load is applied to the engine, is set in a stepped form upon detection of a demand for lead application. This difference FF4__AACV(t) is calculated from the following equation:

$$FF4\_AACV(t) = M41(1)/M42(1) \cdot SW(t) \quad (16)$$

The ignition timing correction factor FF4__ADV(t) is set in a manner to follow the target engine speed, that is, to maintain the model output (engine net output torque) at zero, from the following equation:

$$FF4\_ADV(t) = \{M41(q^{-1}) \cdot SW(t) - M42(q^{-1}) \cdot FF4\_AACV(t)\}/M43(q^{-1})) \quad (17)$$

Figure 14:
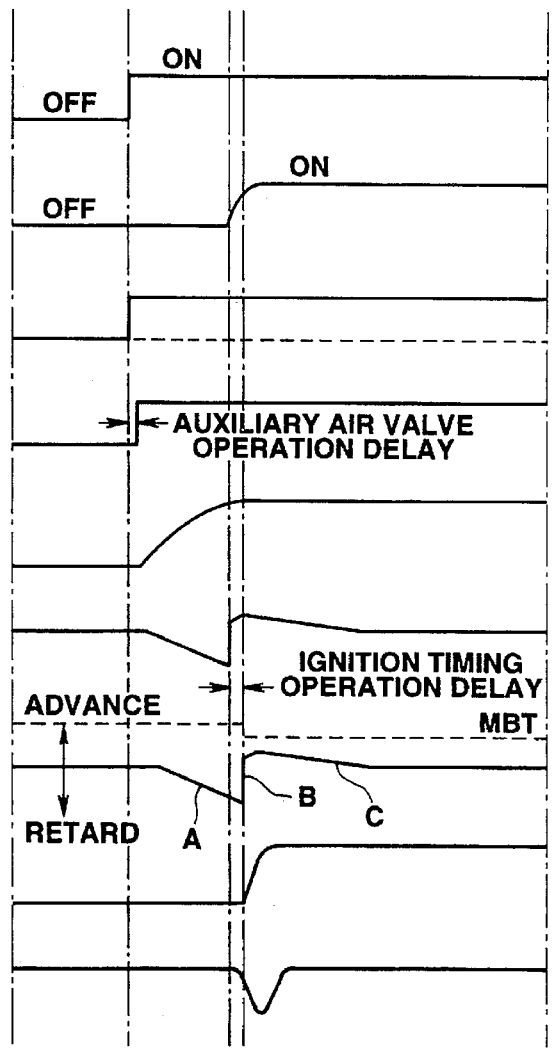
FIGS. 14A to 14I are graphs used in explaining the operation of the modified engine idling speed control apparatus of the invention.

Description will be made in connection of the phase A (FIG. 14G) of the ignition timing correction factor FF4__ADV(t). When the engine control unit 30 detects a demand for lead application to the idling engine, that is, when the shift position sensor 37 changes from its "off" state to its "on" state at idle engine operation (FIG. 14A), the engine control unit 30 produces a command to increase the degree of opening of the auxiliary air control valve 23 by a predetermined value M42(1)/M42(1). The ignition timing is controlled in such a manner that the ignition timing correction factor FF4_ADV(t) varies according to Equation (17) to maintain the engine speed near the target engine speed.

Description will be made in connection of the phase B (FIG. 14G) of the ignition timing correction factor FF4_ADV(t). Just after the oil pressure sensor detects the range shift, the ignition timing is advanced to produce an engine torque corresponding to the load applied to the engine. The auxiliary air correction factor is held at the value M41(1)/M42(1).

Description will be made in connection of the phase C (FIG. 14G) of the ignition timing correction factor FF4_ADV(t). The auxiliary air correction factor is held at the value M41(1)/M42(1) and the ignition timing correction factor decreases according to FF4_ADV(t) of Equation (17) to retard the ignition timing to the reference value for the D range.

Since the auxiliary-air and ignition-timing correction factors are set in such a manner as to maintain the engine net output torque near zero, it is possible to certainly suppress engine speed fluctuations. Since the ignition timing is retarded when the load is applied to the engine, it is possible to ensure a sufficient output torque margin for ignition timing control. Since the basic ignition timing is set toward the maximum torque production side, it is possible to reduce fuel consumption.

What is claimed is:

1. An apparatus for controlling the idling speed of an internal combustion engine, comprising:

first adjustable means for controlling the amount of air supplied to the engine;

second adjustable means for controlling the timing of the sparks supplied to the engine;

feedback control means for controlling the first and second adjustable means for feedback control of the amount of air supplied to the engine and the timing of the sparks supplied to the engine to cause the engine idling speed to follow a target engine idling speed value;

means for detecting a demand for application of a load to the engine;

means for increasing the amount of air supplied to the engine after the load application demand is detected;

means for predicting the magnitude of the load to be applied to the engine and the time at which the load is applied to the engine when the load application demand is detected; and means for correcting the spark timing to produce an engine output condition causing the engine speed to follow the target engine speed value after the load application demand is detected with the use of an engine model indicating an engine output characteristic provided when the spark timing, the amount of air supplied to the engine and the predicted load magnitude are inputted to the engine model.

2. The engine idling speed control apparatus as claimed in claim 1, wherein the engine model indicates the engine output condition in the form of an engine net output torque.

3. The engine idling speed control apparatus as claimed in claim 2, wherein the engine model is a discrete time model of a linear approximation near a set engine idling speed, the engine model indicating a dynamic behavior from the spark timing to an engine net output torque based on a delay and gain, and a dynamic behavior from the amount of air supplied to the engine to the engine net output torque based on a delay and a first-order transfer characteristic.

4. The engine idling speed control apparatus as claimed in claim 2, wherein the engine model includes an additional dynamic behavior from the engine net output torque to an engine speed based on a second-order transfer characteristic.

5. The engine idling speed control apparatus as claimed in claim 2, wherein the engine model indicates the engine output condition in the form of an engine speed.

6. The engine idling speed control apparatus as claimed in claim 5, wherein the engine model is a discrete time model of a linear approximation near a set engine idling speed, the engine model indicating a dynamic behavior from the spark timing to an engine net output torque based on a delay and gain, a dynamic behavior from the amount of air supplied to the engine to the engine net output torque based on a delay and a first-order transfer characteristic.

7. The engine idling speed control apparatus as claimed in claim 5, wherein the engine model includes an additional dynamic behavior from the engine net output torque to and engine speed based on a second-order transfer characteristic.

8. The engine idling speed control apparatus as claimed in claim 2, further including means for changing the target engine speed value based on engine operating conditions, and means for setting the target engine speed value, in a transient before and after the target engine speed value is changed, based on interpolation between a target engine speed value set at a steady condition before the target engine speed value is changed and a target engine speed value set at a steady condition after the target engine speed value is changed.

9. The engine idling speed control apparatus as claimed in claim 2, wherein the means for increasing the amount of air supplied to the engine includes means for increasing the amount of air supplied to the engine in a stepped form by a difference of a first amount of air supplied to the engine to achieve the target engine speed before the load application from a second amount of air supplied to the engine to achieve the target engine speed value after the load application.

10. The engine idling speed control apparatus as claimed in claim 1, wherein the engine model indicates the engine output condition in the form of an engine speed.

11. The engine idling speed control apparatus as claimed in claim 10, further including means for changing the target engine speed value based on engine operating conditions, and means for setting the target engine speed value, in a transient before and after the target engine speed value is changed, based on interpolation between a target engine speed value set at a steady condition before the target engine speed value is changed and a target engine speed value set at a steady condition after the target engine speed value is changed.

12. The engine idling speed control apparatus as claimed in claim 10, wherein the means for increasing the amount of air supplied to the engine includes means for increasing the amount of air supplied to the engine in a stepped form by a difference of a first amount of air supplied to the engine to achieve the target engine speed before the load application from a second amount of air supplied to the engine to achieve the target engine speed value after the load application.

13. The engine idling speed control apparatus as claimed in claim 1, further including means for changing the target engine speed value based on engine operating conditions, and means for setting the target engine speed value, in a transient before and after the target engine speed value is changed, based on interpolation between a target engine speed value set at a steady condition before the target engine speed value is changed and a target engine speed value set at a steady condition after the target engine speed value is changed.

14. The engine idling speed control apparatus as claimed in claim 13, wherein the means for increasing the amount of air supplied to the engine includes means for increasing the amount of air supplied to the engine in a stepped form by a difference of a first amount of air supplied to the engine to achieve the target engine speed before the load application from a second amount of air supplied to the engine to achieve the target engine speed value after the load application.

15. The engine idling speed control apparatus as claimed in claim 1, wherein the means for increasing the amount of air supplied to the engine includes means for increasing the amount of air supplied to the engine in a stepped form by a difference of a first amount of air supplied to the engine to achieve the target engine speed before the load application from a second amount of air supplied to the engine to achieve the target engine speed value after the load application.

16. An apparatus for controlling the idling speed of an internal combustion engine, comprising:

first adjustable means for controlling the amount of air supplied to the engine;

second adjustable means for controlling the timing of the sparks supplied to the engine;

feedback control means for controlling the first and second adjustable means for feedback control of the amount of air supplied to the engine and the timing of the sparks supplied to the engine to cause the engine idling speed to follow a target engine idling speed value;

means for detecting a demand for application of a load to the engine;

means for increasing the amount of air supplied to the engine after the load application demand is detected;

means for controlling the load to be applied to the engine; and means for correcting the spark timing to produce an engine output condition causing the engine speed to follow the target engine speed value after the load application demand is detected with the use of an engine model indicating an engine output characteristic provided when the spark timings the amount of air supplied to the engine and the controlled load are inputted to the engine model.

17. The engine idling speed control apparatus as claimed in claim 16, wherein the engine model indicates the engine output condition in the form of an engine net output torque.

18. The engine idling speed control apparatus as claimed in claim 17, wherein the engine model is a discrete time model of a linear approximation near a set engine idling speed, the engine model indicating a dynamic behavior from the spark timing to an engine net output torque based on a delay and gain, and a dynamic behavior from the amount of air supplied to the engine to the engine net output torque based on a delay and a first-order transfer characteristic.

19. The engine idling speed control apparatus as claimed in claim 17, wherein the engine model includes an additional dynamic behavior from the engine net output torque to an engine speed based on a second-order transfer characteristic.

20. The engine idling speed control apparatus as claimed in claim 17, wherein the engine model indicates the engine output condition in the form of an engine speed.

21. The engine idling speed control apparatus as claimed in claim 20, wherein the engine model is a discrete time model of a linear approximation near a set engine idling speed, the engine model indicating a dynamic behavior from the spark timing to an engine net output torque based on a delay and gain, a dynamic behavior from the amount of air supplied to the engine to the engine net output torque based on a delay and a first-order transfer characteristic.

22. The engine idling speed control apparatus as claimed in claim 20, wherein the engine model includes an additional dynamic behavior from the engine net output torque to an engine speed based on a second-order transfer characteristic.

23. The engine idling speed control apparatus as claimed in claim 17, further including means for changing the target engine speed value based on engine operating conditions, and means for setting the target engine speed value, in a transient before and after the target engine speed value is changed, based on interpolation between a target engine speed value set at a steady condition before the target engine speed value is changed and a target engine speed value set at a steady condition after the target engine speed value is changed.

24. The engine idling speed control apparatus as claimed in claim 17, wherein the means for increasing the amount of air supplied to the engine includes means for increasing the amount of air supplied to the engine in a stepped form by a difference of a first amount of air supplied to the engine to achieve the target engine speed before the load application from a second amount of air supplied to the engine to achieve the target engine speed value after the load application.

25. The engine idling speed control apparatus as claimed in claim 16, wherein the engine model indicates the engine output condition in the form of an engine speed.

26. The engine idling speed control apparatus as claimed in claim 25, further including means for changing the target engine speed value based on engine operating conditions, and means for setting the target engine speed value, in a transient before and after the target engine speed value is changed, based on interpolation between a target engine speed value set at a steady condition before the target engine speed value is changed and a target engine speed value set at a steady condition after the target engine speed value is changed.

27. The engine idling speed control apparatus as claimed in claim 25, wherein the means for increasing the amount of air supplied to the engine includes means for increasing the amount of air supplied to the engine in a stepped form by a difference of a first amount of air supplied to the engine to achieve the target engine speed before the load application from a second amount of air supplied to the engine to achieve the target engine speed value after the load application.

28. The engine idling speed control apparatus as claimed in claim 16, further including means for changing the target engine speed value based on engine operating conditions, and means for setting the target engine speed value, in a transient before and after the target engine speed value is changed, based on interpolation between a target engine speed value set at a steady condition before the target engine speed value is changed and a target engine speed value set at a steady condition after the target engine speed value is changed.

29. The engine idling speed control apparatus as claimed in claim 28, wherein the means for increasing the amount of air supplied to the engine includes means for increasing the amount of air supplied to the engine in a stepped form by a difference of a first amount of air supplied to the engine to achieve the target engine speed before the load application from a second amount of air supplied to the engine to achieve the target engine speed value after the load application.

30. The engine idling speed control apparatus as claimed in claim 16, wherein the means for increasing the amount of air supplied to the engine includes means for increasing the amount of air supplied to the engine in a stepped form by a difference of a first amount of air supplied to the engine to achieve the target engine speed before the load application from a second amount of air supplied to the engine to achieve the target engine speed value after the load application.

31. An apparatus for controlling the idling speed of an internal combustion engine, comprising:

first adjustable means for controlling the amount of air supplied to the engine;

second adjustable means for controlling the timing of the sparks supplied to the engine;

feedback control means for controlling the first and second adjustable means for feedback control of the amount of air supplied to the engine and the timing of the sparks supplied to the engine to cause the engine idling speed to follow a target engine idling speed value;

means for detecting a demand for application of a load to the engine;

means for increasing the amount of air supplied to the engine after the load application demand is detected;

means for detecting the load applied to the engine after the load application demand is detected; and means for correcting the spark timing to produce an engine output condition causing the engine speed to follow the target engine speed value after the load application demand is detected with the use of an engine model indicating an engine output characteristic provided when the spark timing, the amount of air supplied to the engine and the detected load are inputted to the engine model.

32. The engine idling speed control apparatus as claimed in claim 31, wherein the engine model indicates the engine output condition in the form of an engine net output torque.

33. The engine idling speed control apparatus as claimed in claim 32, wherein the engine model is a discrete time model of a linear approximation near a set engine idling speed, the engine model indicting a dynamic behavior from the spark timing to an engine net output torque based on a delay and gain, and a dynamic behavior from the amount of air supplied to the engine to the engine net output torque based on a delay and a first-order transfer characteristic.

34. The engine idling speed control apparatus as claimed in claim 32, wherein the engine model includes an additional dynamic behavior from the engine net output torque to an engine speed based on a second-order transfer characteristic.

35. The engine idling speed control apparatus as claimed in claim 32, wherein the engine model indicates the engine output condition in the form of an engine speed.

36. The engine idling speed control apparatus as claimed in claim 35, wherein the engine model is a discrete time model of a linear approximation near a set engine idling speed, the engine model indicating a dynamic behavior from the spark timing to an engine net output torque based on a delay and gain, a dynamic behavior from the amount of air supplied to the engine to the engine net output torque based on a delay and a first-order transfer characteristic.

37. The engine idling speed control apparatus as claimed in claim 35, wherein the engine model includes an additional dynamic behavior from the engine net output torque to an engine speed based on a second-order transfer characteristic.

38. The engine idling speed control apparatus as claimed in claim 32, further including means for changing the target engine speed value based on engine operating conditions and means for setting the target engine speed value, in a transient before and after the target engine speed value is changed, based on interpolation between a target engine speed value set at a steady condition before the target engine speed value is changed and a target engine speed value set at a steady condition after the target engine speed value is changed.

39. The engine idling speed control apparatus as claimed in claim 32, wherein the means for increasing the amount of air supplied to the engine includes means for increasing the amount of air supplied to the engine in a stepped form by a difference of a first amount of air supplied to the engine to achieve the target engine speed before the load application from a second amount of air supplied to the engine to achieve the target engine speed value after the load application.

40. The engine idling speed control apparatus as claimed in claim 31, wherein the engine model indicates the engine output condition in the form of an engine speed.

41. The engine idling speed control apparatus as claimed in claim 40, further including means for changing the target engine speed value based on engine operating conditions, and means for setting the target engine speed value, in a transient before and after the target engine speed value is changed, based on interpolation between a target engine speed value set at a steady condition before the target engine speed value is changed and a target engine speed value set at a steady condition after the target engine speed value is changed.

42. The engine idling speed control apparatus as claimed in claim 40, wherein the means for increasing the amount of air supplied to the engine includes means for increasing the amount of air supplied to the engine in a stepped form by a difference of a first amount of air supplied to the engine to achieve the target engine speed before the load application from a second amount of air supplied to the engine to achieve the target engine speed value after the load application.

43. The engine idling speed control apparatus as claimed in claim 31, further including means for changing the target engine speed value based on engine operating conditions, and means for setting the target engine speed value, in a transient before and after the target engine speed value is changed, based on interpolation between a target engine speed value set at a steady condition before the target engine speed value is changed and a target engine speed value set at a steady condition after the target engine speed value is changed.

44. The engine idling speed control apparatus as claimed in claim 43, wherein the means for increasing the amount of air supplied to the engine includes means for increasing the amount of air supplied to the engine in a stepped form by a difference of a first amount of air supplied to the engine to achieve the target engine speed before the load application from a second amount of air supplied to the engine to achieve the target engine speed value after the load application.

45. The engine idling speed control apparatus as claimed in claim 31, wherein the means for increasing the amount of air supplied to the engine includes means for increasing the amount of air supplied to the engine in a stepped form by a difference of a first amount of air supplied to the engine to achieve the target engine speed before the load application from a second amount of air supplied to the engine to achieve the target engine speed value after the load application.

* * * * *